United States Patent
Rameau

[11] 3,941,409
[45] Mar. 2, 1976

[54] METHOD AND APPARATUS FOR ATTACHING THE EXHAUST MANIFOLD

[75] Inventor: Jean Rameau, Robert-Sannois, France

[73] Assignees: Regie Nationale des Usines Renault, Billancourt; Automobiles Peugeot, Paris, both of France

[22] Filed: Jan. 24, 1974

[21] Appl. No.: 436,032

[30] Foreign Application Priority Data
Feb. 16, 1973 France .............................. 73.05613

[52] U.S. Cl. ............. 285/137 R; 285/189; 285/325; 29/156.4 R; 403/331; 60/322
[51] Int. Cl.² F16L 39/00; F16L 51/00; B23P 15/00
[58] Field of Search ............. 29/156.4 R; 123/52 M; 60/322, 323; 285/325, 137 R, 189; 403/331, 381, 316, 338, 335, 353

[56] References Cited
UNITED STATES PATENTS

| | | | |
|---|---|---|---|
| 514,822 | 2/1894 | Gennert | 403/335 |
| 1,107,477 | 8/1914 | Bartels | 403/381 |
| 2,003,485 | 6/1935 | Gehres | 60/323 |
| 2,036,087 | 3/1936 | Chapman | 403/338 |
| 2,635,418 | 4/1953 | Leach | 60/323 |
| 2,662,725 | 12/1953 | McVeigh | 403/338 |
| 2,847,820 | 8/1958 | Leach | 60/323 |
| 2,958,547 | 11/1960 | Batts et al. | 285/325 |
| 3,029,597 | 4/1962 | Kolbe | 60/322 |
| 3,365,215 | 1/1968 | Arzt et al. | 285/325 |
| 3,654,581 | 4/1972 | Franz, Jr. | 403/331 |

FOREIGN PATENTS OR APPLICATIONS

| | | | |
|---|---|---|---|
| 39,120 | 10/1909 | Austria | 285/325 |
| 832,330 | 9/1938 | France | 60/323 |
| 862,370 | 3/1941 | France | 285/325 |

*Primary Examiner*—C. W. Lanham
*Assistant Examiner*—Dan C. Crane
*Attorney, Agent, or Firm*—Oblon, Fisher, Spivak, McClelland & Maier

[57] ABSTRACT

A method and apparatus for the elastic attachment of the exhaust manifold to the cylinder head of the motor wherein the manifold is pressed against a gasketed mating surface with the cylinder head by elastic means disposed between the inclined supporting surfaces of the manifold and the cylinder head.

5 Claims, 4 Drawing Figures

METHOD AND APPARATUS FOR ATTACHING THE EXHAUST MANIFOLD

BACKGROUND OF THE INVENTION

1. Field of the Invention

This invention relates generally to a method and apparatus for attaching the exhaust manifold, and more particularly to a method of elastic attachment of the exhaust manifold.

2. Description of the Prior Art

Exhaust manifolds are conventionally attached by means of flanges and bolts in a very rigid manner.

The cylinder head exhaust manifold assembly consists of parts experiencing variations in heating which produce large temperature differences. These differences are increased further by pollution control devices. The result is a rapid loosening of the currently known fastening methods because of the distortions produced by their rigidity and the constraints on resulting expansions.

The problem of resistance to thermal fatique of the manifold because of pitting and grinding of the fastening, responsible for starting leaks, exists in the case of screws since there is a local concentration of pressure.

SUMMARY OF THE INVENTION

Accordingly, one object of this invention is to provide a new and improved method and apparatus for simplifying the assembly of the exhaust manifold.

Another object of the present invention is to provide a method and apparatus for attaching the exhaust manifold which allows expansion of the flange thereof different from that of the cylinder head without loss of sealing.

Still another object of the present invention is to provide a method of attaching the exhaust manifold such that the gasket can be made of more plastic material than that in current use which allows the surfaces in contact with the gasket to be rough.

A still further object of the present invention is to provide a method of attaching the exhaust manifold in a way that renders it easier to overcome the problem of resistance to thermal fatigue of the manifold.

A still further object of the present invention is to provide a method of attaching the exhaust manifold which facilitates the realization of an integral air injection device.

Briefly, in accordance with one embodiment of this invention, these and other objects are obtained by providing a method and apparatus for the elastic attachment of the exhaust manifold to the cylinder head of the motor wherein the manifold is pressed against a gasketed mating surface with the cylinder head by elastic means disposed between the inclined supporting surfaces of the manifold and the cylinder head.

BRIEF DESCRIPTION OF THE DRAWINGS

A more complete appreciation of the invention and many of the attendant advantages thereof will become better understood by reference to the following detailed description when considered in connection with the accompanying drawings wherein.

DESCRIPTION OF THE PREFERRED EMBODIMENT

Figure 1:
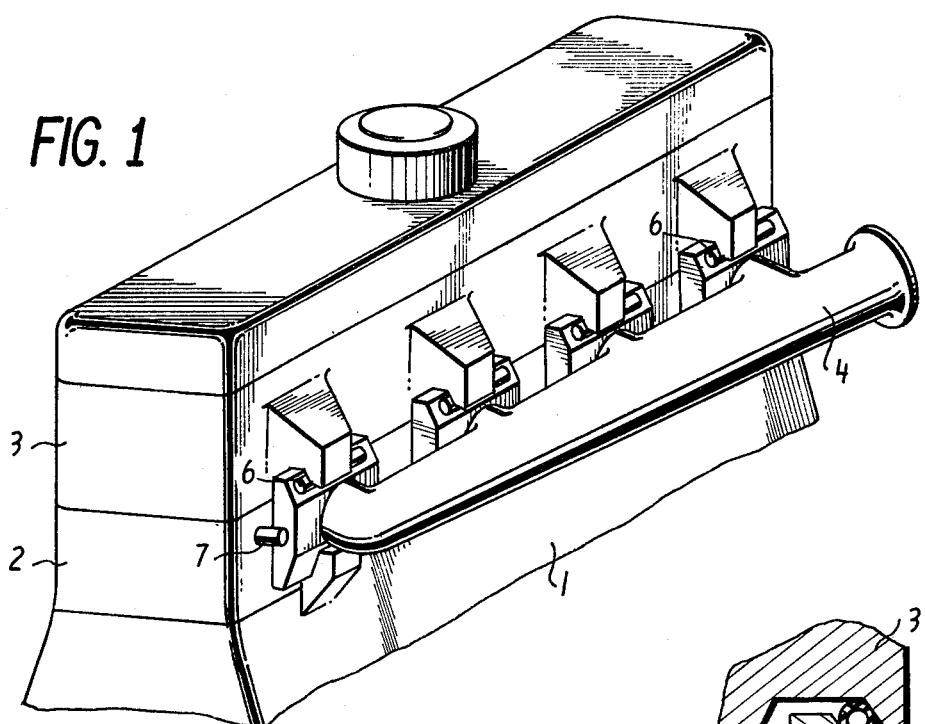
FIG. 1 is a perspective view illustrating a method of fastening the exhaust manifold to the block elastically.
Figure 2:
FIG. 2 is a transverse section through the assembly showing the disposition of the elastic element between the inclined supporting surfaces of the cylinder head and the manifold.

Referring to FIGS. 1 and 2, it is seen that the motor is denoted by 1 and the cylinder head by 2. The rocker arm cover is shown at 3 and the manifold at 4. The gasket 5 is positioned between the manifold and cylinder head. An elastic element is positioned between the cylinder head and manifold at 6 for maintaining essentially constant pressure over the gasket. The pins 7 at the two ends of manifold 4 position the manifold on the cylinder head.

Figure 3:
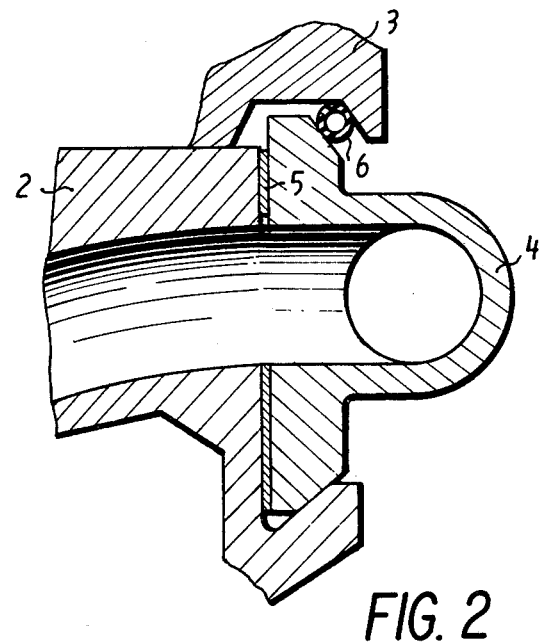
FIG. 3 is a variant of the elastic element consisting simply of a flat wavy spring; and, FIG. 4 shows a variation of the mounting of the manifold on the block.

The elastic means can have diverse forms, e.g., dowels or tubes which are slotted and thus elastic (FIG. 2) or a flat wavy spring (FIG. 3).

Figure 4:
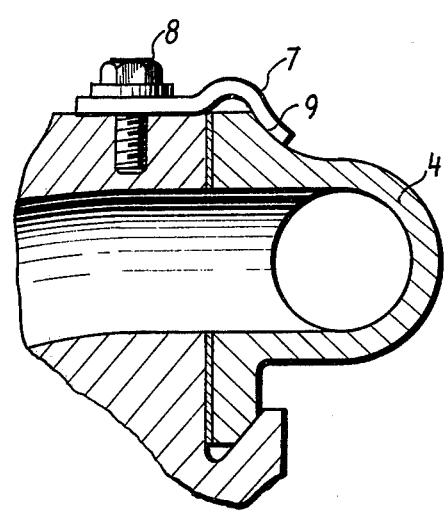

In the example of embodiment in FIG. 4, the elastic supporting means consists of at least a bent flat plate 7 held by the fastening means 8. The supporting edge of plate 7 rests flat against the sloping face 9 of the flange of the manifold 4, thus serving the two functions of retention and application of elastic pressure.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. Apparatus for elastically attaching an exhaust manifold to the cylinder head of a motor comprising: upper and lower, inclined supporting surfaces provided on said exhaust manifold and said cylinder head wherein said inclined supporting surfaces are in facing relationship and said surfaces of both said manifold and head are defined within transversely disposed planes, and elastic means disposed between either said upper or lower inclined supporting surfaces provided on said exhaust manifold and said cylinder head for pressing said exhaust manifold against its gasketed mating surface with said cylinder head and wedging said other exhaust manifold surfaces into contact against said other cylinder head surfaces.

2. Apparatus for the elastic attachment of the exhaust manifold as set forth in claim 1 wherein said inclined supporting surfaces are machined into retaining flanges of said manifold and said cylinder head.

3. Apparatus for the elastic attachment of the exhaust manifold as in claim 1 wherein the elastic means consist of at least a slotted elastic dowel or tube.

4. Apparatus for the elastic attachment of the exhaust manifold as in claim 1 wherein the elastic means consists of at least a flat wavy spring.

5. A method for attachment of an exhaust manifold to the cylinder head of a motor comprising the steps of:
providing upper and lower inclined support surfaces on said exhaust manifold and said cylinder head, said surfaces of both said manifold and head being defined within transversely disposed planes,
arranging said inclined supporting surfaces on said exhaust manifold in facing relationship with said inclined supporting surfaces on said cylinder head, providing elastic means between either said upper or lower inclined supporting surfaces of said exhaust manifold and said cylinder head, while disposing said other surfaces of said manifold and head in contact with each other, pressing said exhaust manifold against its gasketed mating surface with said cylinder head by said elastic means disposed between either said upper or lower inclined surfaces of said exhaust manifold and said cylinder head so as to wedge said other exhaust manifold surfaces against said other cylinder head surfaces, and retaining said exhaust manifold in the present position.

* * * * *